No. 739,587. PATENTED SEPT. 22, 1903.
F. B. CASE.
DETACHABLE LENS BOARD FOR CAMERAS.
APPLICATION FILED DEC. 29, 1902. RENEWED JULY 23, 1903.
NO MODEL.

No. 739,587.

Patented September 22, 1903.

UNITED STATES PATENT OFFICE.

FRANK B. CASE, OF ROCHESTER, NEW YORK.

DETACHABLE LENS-BOARD FOR CAMERAS.

SPECIFICATION forming part of Letters Patent No. 739,587, dated September 22, 1903.

Application filed December 29, 1902. Renewed July 23, 1903. Serial No. 166,774. (No model.)

*To all whom it may concern:*

Be it known that I, FRANK B. CASE, a citizen of the United States, residing at Rochester, in the county of Monroe and State of New York, have invented a new and Improved Detachable Lens-Board for Cameras, of which the following is a specification.

This invention relates to the front board of a photographic camera, and pertains especially to a novel construction and arrangement of a detachable lens-board, which may be readily inserted in such front board and held in place therein and as readily removed therefrom for the purpose of detaching the lens and shutter and their appurtenances and attaching other lenses, shutters, &c.

Heretofore in cameras with detachable lens-boards the front board of the camera has usually been framed together with grooves and tenons and with a square recess formed therein for a square detachable lens-board made out of wood and framed together also in the usual way with grooves and tenons. Through the center of the camera-front board and also through the detachable lens-board a suitable circular opening was provided for receiving the lens-flange. The detachable lens-board framed together in the way just described involves some considerable expense in its manufacture, and it has been customary to attach to such a removable lens-board brass fittings, by means of which the same could be secured in its proper position in the camera-front. To a detachable lens-board, as just described, the lens and shutter flange were secured with the ordinary screws for wood. A detachable lens-board, as described, is quite likely to be split or checked by the insertion of the screws, and it is somewhat expensive to build, and there is considerable additional expense involved in the construction and fitting of the camera-front board to receive such a detachable lens-board.

It is the purpose of my present invention to overcome these difficulties and objections and to provide a detachable lens-board of such a construction that the ordinary lens-flange may be secured thereto by means of the ordinary screw, such as is used for insertion in wood, while at the same time securing the better appearance which results from the use of brass flanges, so that the finished product gives practically the same appearance as the ordinary front board with the lens-flange attached directly thereto.

Figure 1:
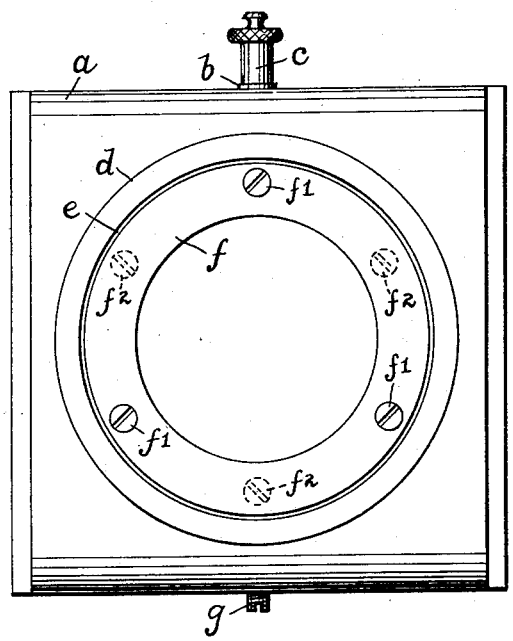
Figure 2:
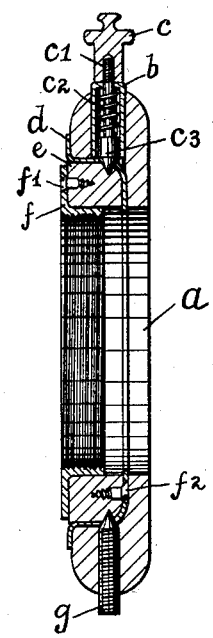

The accompanying drawings, illustrating my invention, are as follows:

Figure 1 is a front or face view of a camera-front board, showing my detachable lens board or flange held in place therein; and Fig. 2 is a vertical sectional view through the center of the removable lens board or flange and perpendicular to the plane of the front board of the parts shown in Fig. 1.

Similar letters refer to similar parts throughout both views.

As seen in the drawings, $a$ is the front board of a camera and has recessed in the center of its front face an opening that practically fits the flanged metal ring $d$, formed as indicated in Fig. 2. This flanged ring $d$ has secured to its front or outer face by means of screws $f^2$, such as ordinarily used for wood, a ring or bushing of wood $e$, the inside diameter of which is practically the same as the inside diameter of the flanged ring $d$, the hole through the lens-board $a$, and also the outside diameter of the threaded tubular portion of the lens-flange $f$. This lens-flange $f$ is secured to the wooden ring or bushing $e$ by the screws $f'$, as indicated, so that such ring $e$ lies between the flange on the ring $d$ and the flange $f$. The flanged ring $d$ has formed in its cylindrical portion two diametrically opposite holes to engage the screw or pin $g$ and the plunger $c^3$, as shown in Fig. 2. The screw $g$ is threaded into the lower part of the board $a$, so that its upper and pointed end projects into the recess in the face of the front board $a$ just far enough to engage the lower hole in the flanged ring $d$. The plunger $c^3$ is rigidly secured to the lower end of a rod $c'$ smaller than the diameter of the plunger $c^3$ and threaded at its upper end into the nut $c$. The plunger $c^3$ travels vertically in a tubular case $b$, secured in the upper part of the board $a$ and having a bore a little larger than the diameter of the plunger $c^3$ and also a hole through its upper end of a size just sufficient to clear the rod $c'$.

A spring $c^2$, located inside the tube $b$ between the upper end of such tube and the plunger $c^3$ and around the rod $c'$, is provided that the plunger $c^3$ may be normally held in its downward position, so as to force the combined nut and handle against the upper end of the tube $b$, for which position the lower pointed end of the plunger $c^3$ projects into the recess formed in the front board $a$ just far enough to firmly engage the upper hole in the flanged ring $d$.

The screw $g$ is so adjusted and the plunger $c^3$ and holes in the ring $d$ are so made that when the parts occupy the relative positions shown in the drawings the action of the spring $c^2$ causes the flanged ring $d$ and parts carried thereby to be securely held in place in the board $a$. Suitable clearances for the points of the screw $g$ and plunger $c^3$ are provided in the ring or bushing $e$.

It will be understood that since the ring or bushing $e$ is of wood any desired lens-flange may be readily secured thereto by means of screws, such as ordinarily used for wood, and in such a position that the lens occupies its proper position angularly when the holes in the ring $d$ are in a vertical line. It will also be understood that since the holes in the flanged ring $d$ are similar and diametrically opposite the ring $d$ and parts carried thereby may be held in the front board $a$ equally well if such ring $d$ be moved around angularly one hundred and eighty degrees.

In order to remove the lens-flange when secured as described to the ring $d$, it is only necessary to pull the nut or handle $c$ up against the action of the spring $c^2$, for which position of the plunger $c^3$ the top of the ring $d$ may be tipped out from the board $a$, and such ring may then be lifted off of the screw $g$. To return the flanged ring $d$ to its place in the board $a$, it is only necessary to enter the upper end of the screw $g$ into one hole in the ring $d$ and snap such ring into place, as the pointed end of the plunger $c^3$ and the rounded edge of the ring $d$ coöperate to cause the plunger $c^3$ to act as a spring-catch.

The wooden ring or bushing $e$ should be forced into the flanged ring $d$ under considerable pressure in order that such ring $d$ may serve to prevent the splitting or checking of the bushing $e$ when the screws are inserted therein for screwing such flanged ring $d$ and also the screws that are used to secure the lens-flange $f$ to such bushing $e$.

It will be at once understood that a considerable number of different lens-flanges may be secured, one at a time and at different times, as occasion may require, to the bushing $e$, and that in order to do this all that is required is a screw-driver and an awl or anything that can be used for an awl to make the holes in the bushing $e$.

The construction as shown and described herein does not differ materially in exterior appearance from the ordinary plain camera-front with the lens-flange secured directly thereto.

What I claim is—

1. In combination with the front board of a camera having a circular recess therein, a metal ring fitted to such recess, means for removably securing such metal ring within such recess in such front board, and a bushing of wood or like material within such metal ring to receive the screws for screwing a lens-flange thereto.

2. In combination with the front board of a camera having a recess therein, a metal frame fitted to such recess, means for removably securing such metal frame within such recess in such front board, and the bushing of wood or like material within such metal frame to receive the screws for screwing a lens-flange thereto.

3. In combination with the front board of a camera having a circular recess therein, a flanged metal ring fitted to such recess, means for removably securing such flanged metal ring within such recess in such front board, and a bushing of wood or like material within such flanged metal ring to receive the screws for screwing a lens-flange thereon.

4. In combination with the front board of a camera having a recess therein, a flanged metal frame fitted to such recess, means for removably securing such flanged metal frame within such recess in such front board, and a bushing of wood or like material within such flanged metal frame to receive the screws for screwing a lens-flange thereto.

5. In combination with the front board of a camera having a recess therein, a flanged metal frame fitted to such recess, means for removably securing such flanged metal frame within such recess in such front board, and a bushing of wood or like material within such flanged metal frame to receive the screws for screwing a lens-flange thereto, such bushing forced into such flanged metal frame under pressure.

6. In combination with the front board of a camera having a recess therein, a metal frame fitted to such recess, means for removably securing such metal frame within such recess in such front board, and a bushing of wood or like material within such metal frame to receive the screws for screwing a lens-flange thereto, such bushing forced into such metal frame under pressure.

7. In combination with the front board of a camera having a circular recess therein, a flanged metal ring fitted to such recess, means for removably securing such flanged metal ring within such recess in such front board, and a bushing of wood or like material within such flanged metal ring to receive the screws for screwing a lens-flange thereto, such bushing forced into such flanged metal ring under pressure.

8. In combination with the front board of a camera having a circular recess therein, a metal ring fitted to such recess, means for removably securing such metal ring within such recess in such front board, and a bushing of wood or like material within such metal ring to receive the screws for screwing a lens-flange thereto such bushing forced into such metal ring under pressure.

FRANK B. CASE.

Witnesses:
ALBERT C. BELL,
A. PEARL MOORE.